United States Patent
Flannigan et al.

(10) Patent No.: US 10,828,889 B2
(45) Date of Patent: Nov. 10, 2020

(54) PRINTING USING AN EXTERNALLY GENERATED REFERENCE

(71) Applicant: Southwest Research Institute, San Antonio, TX (US)

(72) Inventors: William C. Flannigan, San Antonio, TX (US); Glynn R. Bartlett, Boerne, TX (US); Cody E. Bressler, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 16/152,780

(22) Filed: Oct. 5, 2018

(65) Prior Publication Data

US 2020/0108598 A1    Apr. 9, 2020

(51) Int. Cl.
*B41J 2/045* (2006.01)
*B41J 2/21* (2006.01)

(52) U.S. Cl.
CPC ....... *B41J 2/04505* (2013.01); *B41J 2/04586* (2013.01); *B41J 2/21* (2013.01)

(58) Field of Classification Search
CPC ....... B41J 2/04505; B41J 2/04586; B41J 2/21
See application file for complete search history.

(56) References Cited

U.S. PATENT DOCUMENTS

| | | |
|---|---|---|
| 5,450,147 A | 9/1995 | Dorsey-Palmateer |
| 7,175,321 B1 | 2/2007 | Lopez |
| 7,977,026 B2 | 7/2011 | Barr et al. |
| 8,545,943 B2 | 10/2013 | Frankenberger et al. |
| 8,922,817 B2 * | 12/2014 | Matsumoto ............ H04N 1/047 358/1.15 |
| 9,527,275 B1 * | 12/2016 | Flannigan ................ B41J 11/46 |
| 9,849,693 B1 * | 12/2017 | Liu ............................ B41J 2/47 |
| 2007/0046924 A1 * | 3/2007 | Chang ...................... G01C 7/00 356/3.01 |

OTHER PUBLICATIONS

"Think Ink: Airbus Revolutionises How an Airline's Livery Is applied to Jetliners" <<http://www.airbus.com/newsevents/news-events-single/detail/think-ink-airbus-revolutionises-how-an-airlines-livery-is-applied-to-jetliners/>> (accessed Apr. 28, 2016).
"Gray Code"; <<https://en.wikipedia.org/wiki/Gray_code>> (accessed Apr. 28, 2016).
International Search Report & Written Opinion of PCT/US2019/054491 dated Dec. 20, 2019 (11 pgs).

* cited by examiner

*Primary Examiner* — Bradley W Thies
(74) *Attorney, Agent, or Firm* — Grossman Tucker Perreault & Pfleger PLLC (57) ABSTRACT

It is often desirable to apply graphic output to surfaces that are large, irregular, and/or contoured. Application of graphic output on large or complex surfaces may be accomplished by projecting a pattern onto the surface using a projector disposed at a fixed location with respect to the surface. The graphic output is mapped to the projected pattern, by precisely positioning the print head with respect to the projected pattern using a robotic or similar actuated articulated positioning device, graphic output portions may be disposed in each of a plurality of defined locations to form a seamless, large scale graphic output.

19 Claims, 6 Drawing Sheets

PRINTING USING AN EXTERNALLY GENERATED REFERENCE

TECHNICAL FIELD

The present disclosure relates to producing high accuracy graphic output on surfaces that may be large, complex, irregular, and/or contoured.

BACKGROUND

Painting of surfaces having numerous facets and/or curved surfaces is a time consuming process that requires the application of several coats (layers) of paint. Such surfaces are often found on vehicles, structures, and other subjects having complex surface combinations that include convex surfaces, concave surfaces, facets, curves and compound curves. While the primary function of such coatings is often corrosion control, such coatings also provide a distinguishing livery that may be applied as a top coat for utilitarian, branding, aesthetic, and/or marketing purposes. In contrast to monochromatic primer and base coats, liveries may be multicolored and have complex geometries which may include complex digital patterns, logos, graphics or even photorealistic images. Creating these graphics requires significant time and labor expenditures. This is particularly true of the initial masking step that obliges workers to manually fix a stencil on the surface to prevent overspray into non-decorated areas. Because of the difficulty in accurately laying down the masking material on a large, complex surfaces this process is prone to error and time consuming. In addition, masking operations and the multiple paint/cure cycles limit throughput in paint hangars, which further increases operational costs.

Ink or paint-jet technology has the potential to eliminate masking requirements by directly printing graphics on a surface. This capability is analogous to inkjet printing on paper and uses many of the same technologies. Current inkjet printing techniques have demonstrated great versatility with respect to scale and printing substrate. Commercial billboard makers have used large-scale inkjet printing for years as a means of creating highly detailed marketing signs. More recently, vehicle manufacturers have experimented with this technique. However, current inkjet printing technologies can only reliably and accurately print on flat or nearly flat surfaces. To fully leverage the advantages of inkjet printing on curved or similarly complex surfaces, one must be able to print on all (or most) surfaces, including those with complex physical geometries such as compound surfaces.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

A key challenge in developing a large-area inkjet printing system is the positional accuracy required to achieve a seamless graphic that presents the appearance of a continuous graphic image rather than a graphic image composed of a series of parallel graphic swaths. Although small scale output inkjet printers are able to achieve 300 dots per inch (dpi) or greater printing resolution, a resolution of 100 dpi on a large scale output surface, such as a building, commercial vehicle, aircraft fuselage, or aircraft empennage, generally provides a graphic image of sufficient sharpness and clarity. To achieve a printing resolution of 100 dots-per-inch requires the print head to hold and maintain a positional accuracy of $\frac{1}{100}$ of an inch (i.e., 0.01 inches or 0.25 millimeters) across the extent of the graphic image. Current robotic technologies having sufficient reach suitable for application of large-scale graphics to large surfaces are unable to economically attain this level of accuracy; and instead are able to economically achieve an accuracy in the neighborhood of ±1 inch over an area the size of a building, commercial vehicle or aircraft. Thus, inkjet head positioning accuracy must improve by about two orders of magnitude (i.e., from ±1 inch to ±0.01 inch) to make inkjet printing techniques practical for use on large-scale surfaces such as those found on structures, commercial vehicles, and aircraft.

Challenges also exist with printing on the curved and/or irregular surfaces. For example, as the curvature of a surface such as an aircraft fuselage increases, the geometric properties and color representation of the graphic will experience distortion unless appropriate compensatory steps are taken when applying the graphic. The curvature of a surface may also restrict the useful size of the printing end effector or print head. For example, a large gantry may provide a large, relatively flat, surface area, but is incapable of using the full extent of the area provided to effectively and efficiently apply a graphic image on a curved surface such as an aircraft fuselage.

A graphic output may be precisely positioned with respect to a pattern projected on a large and/or contoured surface. Projecting a known or defined pattern on a large, irregular, or contoured surface improves the positional accuracy of a print head, resulting in accurate placement of a graphic output portion on such surfaces. Such projected patterns may be projected on the surface using a pattern projector that remains stationary (i.e., at a fixed location) with respect to a stationary print surface. The projected pattern may include a structured pattern projected at a wavelength that is human perceptible (e.g., using visible light) or human imperceptible (e.g., using ultraviolet or infrared light). The projected pattern may include a random or pseudorandom pattern to which a graphical output has been previously mapped by a print head controller.

In such applications, the projected pattern may be used to determine the position of the print head with respect to the overall graphic output. This approach leverages the relatively high accuracy achievable by positioning one or more pattern projectors at one or more fixed positions with respect to the print surface. When the control circuitry positions the print head with respect to the projected pattern, the print head controller circuitry is able to determine the location of the liquid ejector with respect to the overall graphic output. Thus, successive graphic output portions may be aligned to the accuracy limits of the pattern projected on the surface. The accuracy of such a printing system thus relies upon the ability of the control circuitry to precisely locate the print head within an overall graphic output rather than requiring high absolute accuracy of a pattern reading or detection system coupled to the actuated print head.

Since the physical relationship between the projected pattern and the graphic output is mapped by the control circuitry, the control circuitry is able to precisely locate the print head with respect to the projected pattern and consequently to a portion of the graphic output. By determining the precise position of the print head with respect to the overall graphic output, the control circuit is able to deposit each portion of the graphic output at a defined and mapped (via the projected pattern) location on the surface such that the each of a plurality of graphic output portion form a single, seamless, graphic output.

An application system is provided. The application system may be used to dispose graphics, including large-scale graphics on large, irregular, and/or contoured surfaces. The application system may include: at least one projector to project a pattern across a surface, the projector generating an output having at least one wavelength in a first spectral band; at least one image acquisition device, the at least one image acquisition device sensitive to incident electromagnetic energy in at least the first spectral band; a print head that includes a liquid ejector to deposit a pigmented liquid on a surface; a plurality of actuatable elements operably coupled to the print head; and control circuitry communicably coupled to the at least one projector, the at least one image acquisition device and the print head, the control circuitry to: cause the at least one projector to project a pattern on the surface; map the projected pattern to a graphic output; position the liquid ejector with respect to the projected pattern on a first portion of the surface, the position based at least in part on data received from at least one image acquisition device; cause the liquid ejector to selectively deposit the pigmented liquid to form at least a portion of the graphic output on the first portion of the surface.

An application method is provided. The application method may be used to dispose graphics, including large-scale graphics on large, irregular, and/or contoured surfaces. The application method includes: causing, by control circuitry, a projector disposed in a first fixed location to project a defined pattern on a surface in a second fixed location; receiving, by control circuitry, data representative of the projected pattern incident upon the first portion of the surface from one or more communicably coupled image acquisition devices; mapping, by the control circuitry, the projected pattern to a graphic output; positioning, by the control circuitry, a liquid ejector disposed in a print head at a defined location on the graphic output using the received data representative of the projected pattern; and causing, by the control circuitry, the liquid ejector to selectively deposit a portion of a graphic output.

A print head controller is provided. The print head controller may be used to control a print head used to dispose graphics, including large-scale graphics on large, irregular, and/or contoured surfaces. The print head controller may include: at least one output interface to provide at least: a first output signal to at least a first liquid ejector disposed in a communicably coupled print head; and a second output signal including information indicative of a projected pattern to at least one communicably coupled projector, the second output signal to cause the projector to project at least a portion of the projected pattern on a surface, the at least one projector disposed in a first fixed location with respect to the surface disposed in a second fixed location; at least one input interface to receive at least: a first input signal from at least one communicably coupled image acquisition device, the first input signal including data representative of the projected pattern proximate the communicably coupled print head; control circuitry communicably coupled to the at least one input interface and the at least one output interface, the controller circuit to: map a graphic output to the projected pattern; responsive to the receipt of the first input signal, determine a location of the print head with respect to the graphic output using the data representative of the projected pattern proximate the communicably coupled print head; and cause a liquid ejector disposed in the print head to selectively deposit at least a portion of the graphic output on the surface.

Figure 1:
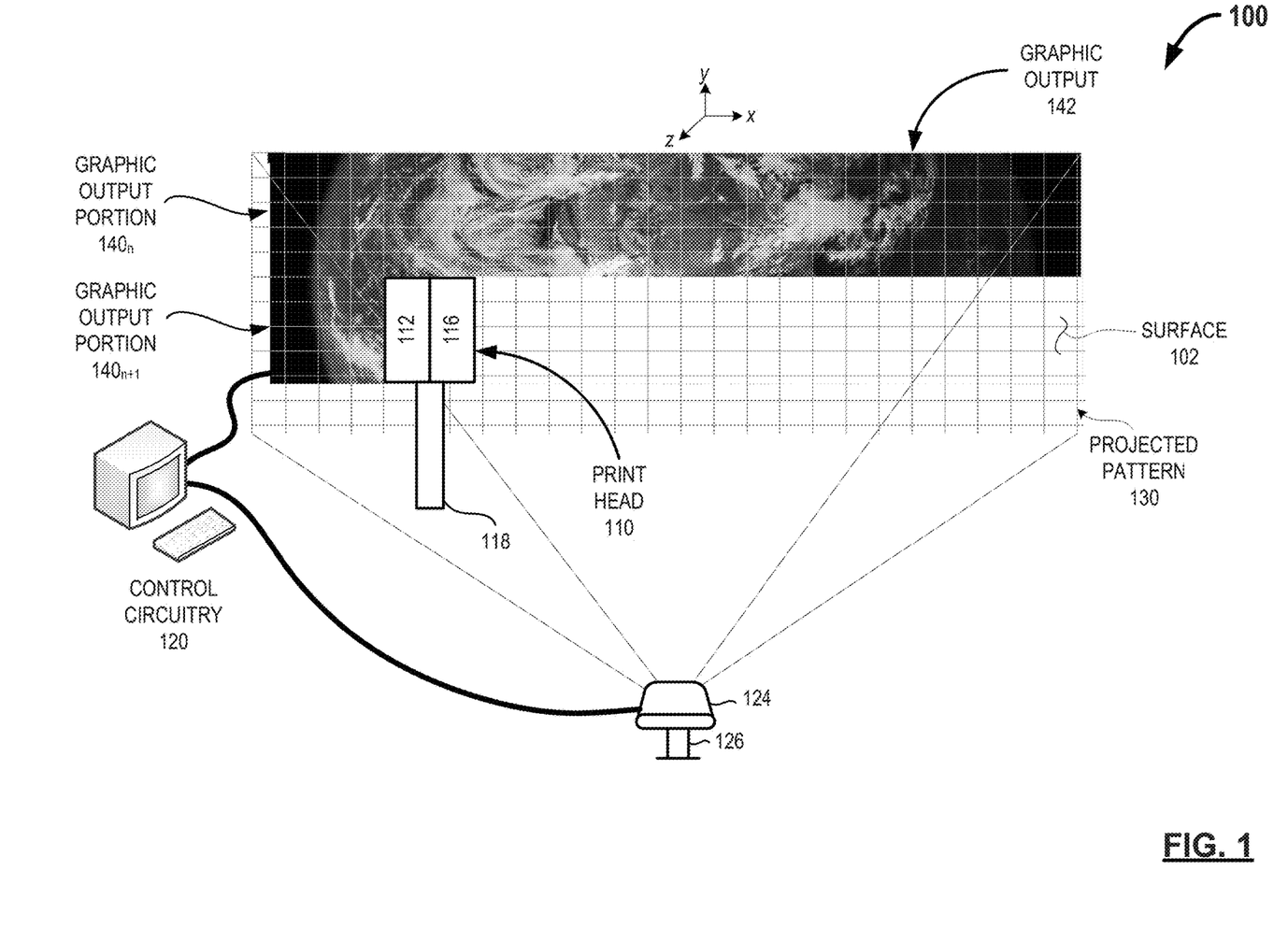
FIG. 1 provides a schematic diagram of an illustrative graphic output system, in accordance with at least one embodiment of the present disclosure.

FIG. 1 is a schematic diagram of an illustrative large-area printing system 100, in accordance with at least one embodiment of the present disclosure. The large-area printing system 100 includes a print head 110. The print head 110 may include one or more liquid ejector 112 and an image acquisition device 116. In some implementations, the print head 110 may include a housing (not shown in FIG. 1) disposed at least partially about some or all of the one or more liquid ejector 112 and/or the image acquisition device 116. As depicted in FIG. 1, the print head 110 is oriented such that a direction of travel exists along an x-axis, however the print head 110 is not limited to traveling along only the x-axis and may, in other embodiments, travel along a y-axis or any combination of x- and y-axes. Control circuitry 120 communicably couples to the print head 110 and at least partially controls the deposition of the materials forming the graphic output 142 on the surface.

The graphic output 142 deposited on a surface 102 may be formed as a number of graphic output portions $140_1$-$140_n$ (collectively "graphic output portions 140") such that a seamless graphic output results. To achieve a seamless graphic output 142, a number of graphic output portions $140_1$-$140_n$ are deposited at defined locations on the projected pattern 130 on the surface 102. A first graphic output portion $140_1$ is deposited on the surface 102 at a defined location the control circuitry 120 has mapped to the projected pattern 130. Subsequent graphic output portions $140_2$-$140_n$ are deposited on the surface 102 at defined locations the control circuitry 120 has mapped to respective positions on the projected pattern 130 such that an aligned, seamless, image is created by all of the graphic output portions 140.

In embodiments, the image acquisition device 116 detects the projected pattern 130 on the surface 102 and aligns the liquid ejector 112 with the projected pattern 130 such that a seamless juncture, connection, or transition is formed between each of the graphic output portions 140. In embodiments, such as that depicted in FIG. 1, after aligning the liquid ejector 112 with a defined point, position, or location in the projected pattern 130, the liquid ejector 112 deposits the graphic output portion $140_n$ along and/or over the projected pattern 130 while maintaining alignment between the liquid ejector 112 and the projected pattern 130. After completing each graphic output portion $140_n$, the printing system 100 indexes the print head 110 and aligns the liquid ejector 112 with a defined point, position, or location in the projected pattern 130 and applies the subsequent graphic output portion $140_{n+1}$.

Such a system leverages the inherent positional accuracy of the projected pattern 130 provided by a stationary pattern projector 124 on the surface 102 and the ability to precisely map or otherwise correlate the desired graphic output 140 with the projected pattern 130. The control circuitry 120 positions the print head 110 at a location on or above the surface 102 using the projected pattern 130 to precisely position the print head 110 with respect to the surface 102.

The liquid ejector 112 may include any number or combination of systems and/or devices capable of receiving a colorant, such as a pigmented fluid or a pigmented liquid, from a supply, such as a reservoir, and selectively ejecting the received colorant onto a surface 102. In various implementations, the liquid ejector 112 may include any number or combination of orifices, nozzles, ported chambers, or similar apertures through which the pigmented liquid may be selectively ejected under pressure. In some implementations, the liquid ejector 112 may receive and mix, react, or otherwise combine a number of different color pigmented liquids (e.g., cyan, magenta, yellow, white, and black pigmented liquids) at each of the orifices, nozzles, ported chambers, or apertures. In such an implementation, a pigmented liquid in a large number of colors and/or hues (e.g., 16 million) may be generated at each of the orifices, nozzles, ported chambers, or apertures.

In some implementations, the liquid ejector 112 may receive a single color pigmented liquid (e.g., a cyan, a magenta, a yellow, or a black pigmented liquid) at each of the orifices, nozzles, ported chambers, or apertures. In such implementations, the liquid ejector 112 may selectively eject two or more different color pigmented liquids from different orifices, nozzles, ported chambers, or apertures such that the ejected pigmented liquids mix, react, or otherwise combine to form any one of a large number of colors and/or hues prior to or upon deposition on the surface 102. In some implementations, the liquid ejector 112 may receive the pigmented liquid as a solid pigmented media. In embodiments, the liquid ejector 112 may include one or more components, such as one or more heaters, that liquefy the solid pigmented media. In other embodiments, the liquid ejector 112 may include one or more components, such as one or more devices or systems capable of sublimating the solid pigmented media onto the surface 102.

Each of the graphic output portions 140 may have the same or different dimensions. In embodiments, each of the graphic output portions 140 may have any dimensions (width, height, radius, etc.). In embodiments, one or more dimensions of the graphic output portion $140_n$ deposited by the liquid ejector 112 may be selected based at least in part on any distortions, contours and/or irregularities apparent in the surface 102 on which the graphic output portion $140_n$ will be deposited. For example, a graphic output portion $140_n$ deposited on a distorted, highly contoured, and/or a highly irregular surface 102 may benefit from one or more relatively smaller dimensions. Conversely, a graphic output portion 140 deposited on a lightly contoured and/or a smooth surface 102 may benefit from one or more relatively larger dimensions.

In some implementations, the liquid ejector 112 may be capable of selectively producing a variable dimension graphic output portion $140_n$ (e.g., a graphic output portion $140_n$ having a selectively variable width). In some implementations, the control circuitry 120 may alter, adjust, or select one or more dimensions of the graphic output portion $140_n$ based on one or more measured or detected parameters indicative of a distortion, contour, and/or irregularity associated with the surface 102 on which the respective graphic output portion $140_n$ will be deposited. For example, the control circuitry 120 may cause the selective deposition of a relatively narrow graphic output portion $140_n$ on a highly contoured or highly irregular surface 102. In another example, the control circuitry 120 may cause the selective deposition of a relatively wide graphic output portion $140_n$ on a lightly contoured or smooth surface 102.

Each of the pattern projectors 124 may include any number and/or combination of systems and/or devices capable of projecting electromagnetic radiation at one or more defined wavelengths and one or more defined structured, random, or pseudorandom patterns. In embodiments, the one or more pattern projectors 124 may emit electromagnetic radiation at one or more wavelengths in the human visible electromagnetic spectrum, including wavelengths from 390 nanometers to 700 nanometers. In embodiments, the one or more pattern projectors 124 may emit electromagnetic radiation at one or more wavelengths in the human-invisible infrared electromagnetic spectrum, including wavelengths above 700 nanometers. In embodiments, the one or more pattern projectors 124 may emit electromagnetic radiation at one or more wavelengths in the human-invisible ultraviolet electromagnetic spectrum, including wavelengths below 390 nanometers. In embodiments, the one or more pattern projectors 124 may each project electromagnetic radiation at the same wavelength or in the same wavelength band. In other embodiments, the one or more pattern projectors 124 may each project electromagnetic radiation at different wavelengths or in different wavelength bands. In some embodiments, the one or more pattern projectors 124 may include one or more actuated monochromatic lasers that the control circuitry 120 causes to "sweep" or otherwise traverse the surface 102 in a defined pattern.

In embodiments, the projected pattern 130 may include a unique (i.e., non-repeating) pattern that extends across at least a portion of the surface 102. In other embodiments, the projected pattern 130 may include a number of identical, repeating pattern segments that have a length greater than or equal to the measurement uncertainty of the actuator system 118 used to position and move the print head 110 (e.g., a robotic arm or other robotic assembly to which the print head 110 is affixed). For example, a print head 110 affixed to an actuator system 118 having a positional uncertainty of ±1 inch (±25 mm) and positioned at a location "x" along an axis may be located at any point from "x−1 inch" to "x+1 inch" along the axis. The measurement uncertainty or "range of uncertainty" of the print head is therefore up to 2 inches. In such an instance, a projected pattern 130 that comprises a repeated unique pattern should have a unique pattern length of at least 2 inches (50 mm), i.e., the measurement uncertainty of the print head based on the positional uncertainty of the actuator system 118. By combining the approximate position of the print head 110 with respect to the surface 102 with the position as determined using the projected pattern 130, the position of the print head 110 along a single axis may be determined to the resolution of the printed element size of the projected pattern 130 deposited on the surface 102.

The image acquisition device 116 may include any number and/or combination of monochromatic or color systems and/or devices capable of detecting the projected pattern 130 deposited on the surface 102. Although depicted as disposed in the print head 110, in embodiments, the image acquisition device 116 may be disposed remote from the print head 110. For example, the image acquisition device 116 may be disposed on a stationary platform or on the actuator system 118. In embodiments, the image acquisition device 116 may include any number or combination of current or future image acquisition sensors or devices, such as any number of charge coupled device (CCD) image sensors, or any number of complementary metal oxide semiconductor (CMOS) image sensors. In embodiments, the image acquisition device 116 may include one or more image enhancement components, devices, or systems, such as one or more digital signal processors. In some implementations, the image acquisition device 116 may include a plurality of devices, each having different optical properties. For example, the image acquisition device 116 may include a first image capture device having a relatively short focal length and a relatively wide field-of-view useful for obtaining wide angle images of the surface 102, such as images useful for initially positioning the print head on the surface 102. The image acquisition device 116 may further include a second image capture device having a relatively long focal length and a relatively narrow field-of-view useful for obtaining narrow angle or detail images of the surface 102, such as detail images of the encoder pattern 130 on the surface 102.

In some implementations, the image acquisition device 116 may include any number of individual image acquisition devices, such as any number of image sensors capable of capturing images in the visible portion of the electromagnetic spectrum having wavelengths of from about 390 nanometers to about 700 nanometers. In some implementations, the image acquisition device 116 may include any number of individual image acquisition devices, such as any number of image sensors capable of capturing images outside of the visible portion of the electromagnetic spectrum (e.g., in the ultraviolet spectrum at wavelengths of less than about 390 nanometers (nm) or in the infrared spectrum at wavelengths greater than about 700 nm). In such implementations, the pattern projector 124 may be capable of producing and/or emitting electromagnetic radiation at one or more defined wavelength ranges such that the projected pattern 130 is visible to at least the image acquisition device 116.

The image acquisition device 116 generates at least one signal that may include information or data representative of at least the projected pattern 130 proximate the print head 110. In some implementations, the image acquisition device 116 may wirelessly communicate all or a portion of the at least one signal to control circuitry 120 disposed remote from the print head 110. In other implementations, the image acquisition device 116 may communicate all or a portion of the at least one signal to control circuitry 120 disposed remote from the print head 110 via one or more wired or tethered connections, such as a universal serial bus (USB) cable, or via a hard bus that is internal to a processor-based device that is providing at least a portion of the control circuitry 120. In some implementations, the image acquisition device 116 may communicate all or a portion of the at least one signal to control circuitry 120 disposed at least partially within the print head 110.

In embodiments, the image acquisition device 116 may communicate one or more signals that include information or data representative of the structured light pattern formed on the surface 102 to the control circuitry 120. The control circuitry 120 may use the information or data representative of the projected pattern 130 to identify and measure at least one physical, mechanical, and/or optical parameter associated with each of the contours or irregularities (extent, depth, radius of curvature, glossiness, reflectance, etc.) of the surface 102.

The control circuitry 120 alters, adjusts, or controls the position and/or movement of the print head 110 relative to the surface 102. The control circuitry 120 may include any number and/or combination of devices and/or systems capable of receiving a signal that includes information indicative of the projected pattern 130 on the surface 102, positioning the liquid ejector 112 with respect to the projected pattern 130, and causing the liquid ejector 112 to deposit a graphic output portion 140$_n$ forming a portion of the graphic output 142 at a location determined with respect to the projected pattern 130. In embodiments, all or a portion of the control circuitry 120 may be disposed in the print head 110. In other embodiments, all or a portion of the control circuitry 120 may be disposed external to or remote from the print head 110.

In embodiments, the control circuitry 120 may include, but is not limited to, any one or more of the following: a hard-wired control circuit, a generic processor capable of executing machine readable instructions that cause the processor to function as specialized high-accuracy print control circuitry, an application specific integrated circuit (ASIC), a field programmable gate array (FPGA), a programmable controller, a digital signal processor (DSP), a reduced instruction set computer (RISC), or a system on a chip (SoC). In some implementations, the control circuitry 120 may be implemented in whole or in part as a portion of a system controller or processor, for example as a thread in a single- or multi-core microprocessor.

In some implementations, the control circuitry 120 may perform a structured light analysis of at least a portion of the surface 102 on a one-time, periodic, aperiodic, or continuous basis. For example, the control circuitry 120 may perform the structured light analysis on a continuous basis to detect the presence of contours or irregularities present on the surface as the print head 110 traverses the surface and prior to depositing the graphic output portion 140$_n$ on the surface 102. In various implementations, the control circuitry 120 may alter or adjust at least one operational parameter such that the graphic output 142 deposited on the surface 102 minimizes or masks the appearance of contours and/or surface irregularities when viewed from one or more viewing angles or one or more viewing arcs. In other implementations, the control circuitry 120 may alter or adjust at least one operational parameter of the liquid ejector 112 in response to detecting contours or irregularities in the surface that would adversely impact (e.g., distort the appearance of) the contents of the graphic output portion 140$_n$. Such operational parameter adjustments may include, but are not limited to, adjusting the velocity of the pigmented liquid deposited on the surface, adjusting the composition of the pigmented liquid deposited on the surface, adjusting the distance between the liquid ejector and the surface, traverse speed of the print head across the surface, or combinations thereof.

Figure 2A:
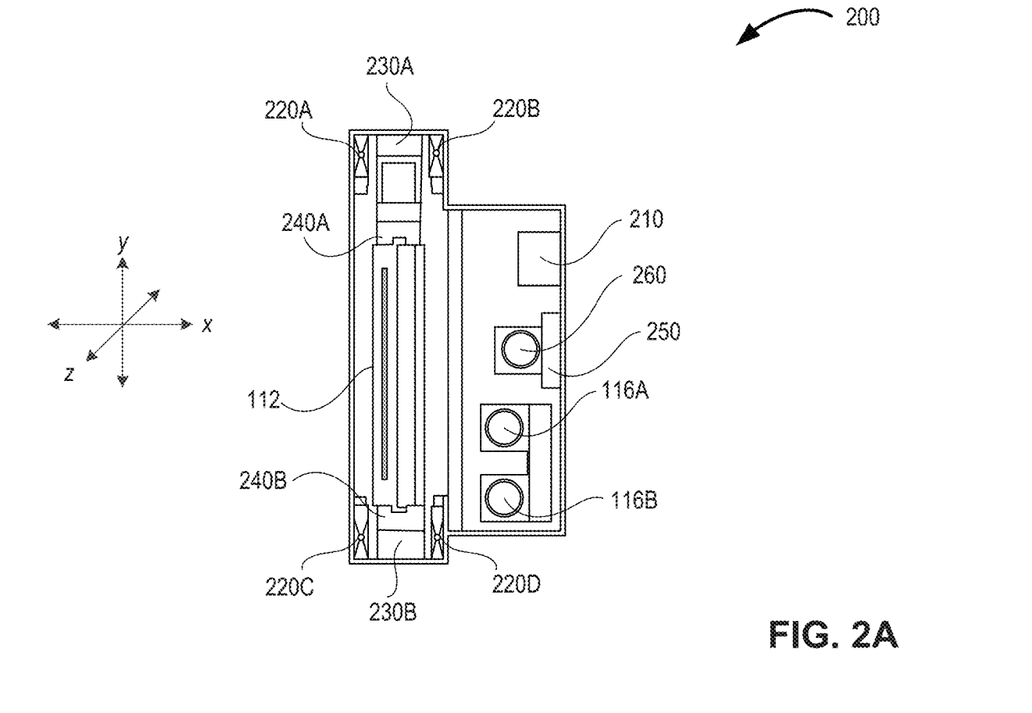
FIG. 2A provides an elevation of an illustrative print head that includes a liquid ejector, a plurality of image acquisition devices, at least one inertial measurement unit (IMU), and a plurality of standoff sensors, a plurality of actuatable elements, a plurality of vertical linear actuators, a laser line projector, and a laser line image acquisition device, in accordance with at least one embodiment of the present disclosure.
Figure 2B:
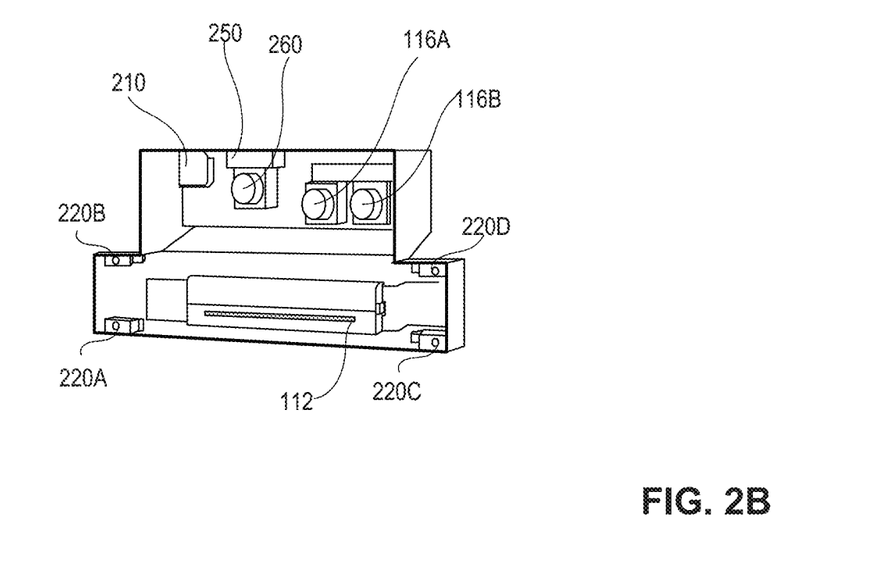
FIG. 2B provides a perspective view of the illustrative graphic output system print head depicted in FIG. 2A, in accordance with at least one embodiment of the present disclosure.

FIG. 2A provides an elevation of an illustrative print head 200 that includes a liquid ejector 112, a plurality of image acquisition devices 116A-116B (collectively, "image acquisition devices 116"), at least one inertial measurement unit (IMU) 210, and a plurality of standoff sensors 220A-220D (collectively, "standoff sensors 220"), a plurality of actuatable elements 230A-230B (collectively, "actuatable elements 230"), a plurality of vertical linear actuators 240A-240B (collectively, "vertical linear actuators 240"), a laser line projector 250, and a laser line image acquisition device 260, in accordance with at least one embodiment of the present disclosure. FIG. 2B provides a perspective view of the illustrative high-accuracy inkjet printing system print head 200 depicted in FIG. 2A, in accordance with at least one embodiment of the present disclosure. The print head 200 depicted in FIGS. 2A and 2B includes a number of components that assist in positioning the print head 200 over the surface 102.

At least some of the plurality of image acquisition devices 116 scan the projected pattern 130. In addition, at least some of the plurality of image acquisition devices 116 may scan the surface 102 and detect a laser line or similar pattern projected on the surface 102, for example a laser line projected by laser line projector 250.

The print head 200 includes at least one inertial measurement unit (IMU) 210. In embodiments, the inertial measurement unit (IMU) 210 may produce or otherwise generate a number of signals that include data representative of a velocity of the print head 200 along one or more axes, data representative of an orientation of the print head 200, and/or data representative of an acceleration of the print head 200 along one or more axes, using a combination of accelerometers, gyroscopes, and/or magnetometers. In some implementations, the IMU 210 may measure or otherwise determine one or more acceleration parameters along each of a plurality of degrees-of-freedom, for example a nine (9) degree-of-freedom IMU. In some instances, the inertial data provided by the IMU 210 may be used to monitor the tilt of the print head 200. In some instances, at least a portion of the inertial data provided by the IMU 210 may be provided to the control circuitry 120. In at least some implementations, the data provided by the IMU 210 may be used by the control circuitry 120 to perform or otherwise determine one or more path prediction methods along the surface 102.

The print head 200 also includes a plurality of standoff or distance sensors 220, each of which generates at least one signal that includes information or data representative of a distance, or standoff, between the print head 200 and the surface 102. Each of the plurality of standoff sensors 220 may include a noncontact distance sensor. Non-limiting examples of noncontact distance sensors include, but are not limited to, electromagnetic (e.g., radar) distance sensors, ultrasonic distance sensors, or combinations thereof. Each of the plurality of standoff sensors 220 may be positioned in a corner of the print head 200 such that the distance between any portion of the print head 200 and the surface 102 (e.g., the distance along the z-axis) may be accurately measured. In some implementations, some or all of the plurality of standoff sensors 220 may provide to the control circuitry 120 one or more signals that include information or data representative of an orientation about a pair of orthogonal axes that define a plane containing at least a portion of the surface 102 (e.g., the orientation along the x-axis and the y-axis).

The print head 200 may include a plurality of actuatable elements 230. The actuatable elements 230 may include any number or combination of linear actuatable elements for positioning the print head 200 along one or more principal orthogonal axes (e.g., x-axis, y-axis, z-axis) and/or any number or combination of rotary actuatable elements for positioning the print head 200 about one or more principal orthogonal axes (e.g., roll, pitch, yaw). Each of the plurality of actuatable elements 230 may receive a signal from the control circuitry 120. In embodiments, the control circuitry 120 may cause the actuatable elements 230 to alter, control, or otherwise adjust the position of the print head 200 along an axis normal to the graphic swath 140 (i.e., along the y-axis as depicted in FIG. 2A). In at least some embodiments, the control circuitry 120 may alter, control, or otherwise adjust the position of the print head 200 along an axis normal to the graphic output portion 140$_n$ in response to receipt of one or more signals from one or more of the image acquisition devices 116. The actuatable elements 230 enable the print head 200 to compensate for any minor misalignment along the axis normal to the graphic output portion 140$_n$ attributable to the positional error of the actuator system 118 to which the print head 200 is operably coupled. In at least some implementations, the actuatable elements 230 may include a number of high-bandwidth linear actuators. Each of the number of high-bandwidth linear actuators are capable of rapid movement through a small displacement thereby permitting the control circuitry 120 to quickly adjust the position of the print head 200 to track the projected pattern 130 on the surface 102.

In some implementations, the IMU 210 may adjust the movement of the print head 200 to compensate for high-frequency vibrations present in the print head 200. Such high-frequency vibrations may be caused by a variety of sources including the movement of the actuator system 118 carrying the print head 200. In operation, the image acquisition devices 116 may provide sufficient resolution and response to permit the actuatable elements 230 to accommodate gross (e.g., greater than 10 millimeters) and low-frequency (e.g., less than 1 Hertz) disturbances. The IMU 210, when combined with a number of high speed actuatable elements coupled to the print head 200 or end effector carrying the print head 200 may compensate for low displacement, high-frequency disturbances. Combined, the actuatable elements 230 and the high-speed actuateable elements are able to stabilize the print head 200 against vibration and compensate for gross inaccuracies of the positioning of the print head 200 during the printing process. The print head 200 may include a plurality of vertical linear actuators 240 that are operably coupled to the liquid ejector 112. In embodiments, the control circuitry 120 may generate one or more output signals that cause the vertical linear actuators 240 to alter, control, or otherwise adjust the distance or standoff between the liquid ejector 112 and the surface 102 (i.e., adjust the distance along the z-axis as depicted in FIG. 2A). In at least some embodiments, the control circuitry 120 may alter, control, or otherwise adjust the distance or standoff between the liquid ejector 112 and the surface 102 in response to receipt of one or more signals from the standoff sensors 220 containing information or data representative of the distance or standoff between the liquid ejector 112 and the surface 102. In some implementations, the control circuitry 120 may alter, control, or otherwise adjust the distance or standoff between the liquid ejector 112 and the surface 102 to compensate for one or more detected contours and/or irregularities in the surface 102.

The print head 200 may further include at least one laser line projector 250 and a laser image acquisition device 260. In at least some implementations, the laser line projector 250 may project a spot, line, or pattern formed using the monochromatic laser line projector 250 onto the surface 102. The laser image acquisition device 260 may detect the projected laser and communicate at least one signal that includes information or data representative of a contour or irregularities in the surface 102 to the control circuitry 120. In some implementations, the laser line projector 250 may generate and output a laser output in the visible electromagnetic spectrum having wavelengths from 390 nanometers to 700 nanometers and the laser image acquisition device 260 may be sensitive to laser outputs in the visible electromagnetic spectrum. In some implementations, the laser line projector 250 may generate and output a laser output in the infrared electromagnetic spectrum having wavelengths greater than 700 nanometers and the laser image acquisition device 260 may be sensitive to laser outputs in the infrared electromagnetic spectrum. In some implementations, the laser line projector 250 may generate and output a laser output in the ultraviolet electromagnetic spectrum having wavelengths less than 390 nanometers and the laser image acquisition device 260 may be sensitive to laser outputs in the ultraviolet electromagnetic spectrum. In some implementations, the at least one laser line projector 250 and a laser image acquisition device 260 may provide information and/or data to the control circuitry 120 sufficient to generate of high resolution maps of the surface that permit the control circuitry 120 to preemptively detect surface contours and irregularities. In some implementations, the at least one laser line projector 250 and a laser image acquisition device 260 may provide information to the control circuitry 120 sufficient to avoid obstructions or other elements present on the surface 102.

Figure 3:
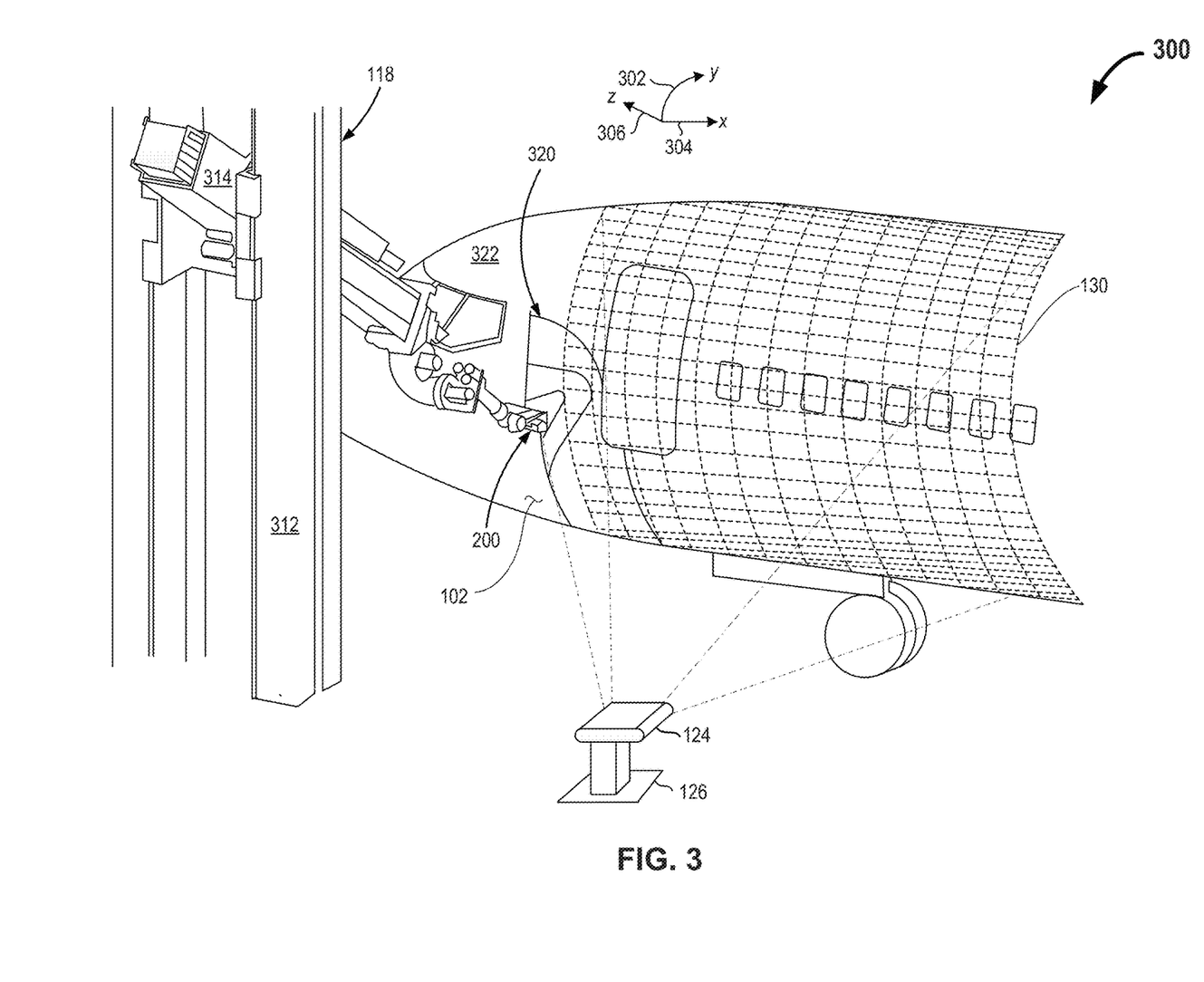
FIG. 3 provides a perspective view of an illustrative graphic output system that includes a print head mounted on an actuator system that may be used to apply a large-scale graphic image to a surface, such as an exterior surface of an airliner, in accordance with at least one embodiment of the present disclosure.

FIG. 3 is a perspective view of an illustrative high-accuracy inkjet printing system 300 including a print head 200 mounted on an actuator system 118 that may be used to apply a large-scale graphic image 320 to a contoured surface 102, such as an exterior surface of an airliner, in accordance with at least one embodiment of the present disclosure. The actuator system 118 may include a gantry 312 and an arm 314. The print head 200 may be operably coupled to an end of the arm 314. In the illustrative embodiment depicted in FIG. 3, the actuator system 118 is applying a graphic 320 to a surface 102 that includes an aircraft fuselage 322. The actuator system 118 is passing the print head across the surface 322 of the fuselage to deposit the graphic image 320 on the surface 322 of the fuselage.

The projected pattern 130 on the surface 322 may directly encode the linear travel along a first axis 302 that is in-plane with the aircraft fuselage 322 (e.g., the y-axis in FIG. 3) of the actuator system 118. The projected pattern 130 may repeat provided the unique encoder pattern length (i.e., the length of a single unique encoder pattern) exceeds the measurement uncertainty of the actuator system 118. By combining the approximate position of the actuator system 118 (e.g., approx. ±1 inch or ±25 mm) with the position determined by the projected pattern 130, the position of the print head 110 along a single axis may be estimated to the resolution of the printed pixel size (e.g., 0.01 inches or 0.025 mm). Since the projected pattern 130 is positioned at a defined position from the graphic output portion $140_n$, the position of the print head 110 along a second axis 304 (e.g., the x-axis in FIG. 3) that is in-plane with and orthogonal to the first axis 302 should also be measurable to the pixel resolution. The yaw of the print head 110—the orientation of the print head 110 about a third axis 306 that is normal to the surface 102 and orthogonal to the first axis 302 and the second axis 306—(e.g., the z-axis in FIG. 3) may be estimated by the control circuitry 120 by measuring an angle of the projected pattern 130 on the surface 322 of the fuselage. A standoff distance between the print head 110 and the surface 322 of the fuselage, a roll angle of the print head 110 about the first axis 302, and a pitch angle of the print head 110 about the second axis 304 may be controlled by the control circuitry 120 based at least in part on one or more standoff sensors 220 and the IMU 210 coupled to the print head 200.

The state variables of the actuator system 118 include the pose of the print head 200 (e.g., the six (6) degrees-of-freedom described in the previous paragraph) and the velocity of the print head 200 with respect to the surface 102 (i.e., the aircraft fuselage 322). The state variables of the actuator system 118 may be estimated using a model, generated for the motion of the print head 200 and the print head measurements (e.g., standoff from the aircraft fuselage 322). Such a model may provide the state variables with less uncertainty than estimates generated using individual measurements. In some implementations, such models enable the estimation of the position of the actuator system 118 along the print direction to a greater level of accuracy than the printed resolution (e.g., 100 dots per inch) of the projected pattern 130. A Kalman Filter, an Extended Kalman Filter (EKF), a Double Exponential Smoothing Filter, a Particle filter, a Gauss-Newton Filter, Recursive Total Least Squares Filter, or a Nonlinear Bayesian Filter may be used as the basis for such a predictive model useful for controlling the actuator system 118 and consequently the movement of the print head 200 across the surface 322 of the fuselage. Advantageously, such predictive models may be used to accurately predict state variables, thereby permitting the control circuitry 120 to compensate for any latency that exists between the completion of the image processing and communication of one or more control signals to the actuator system 118.

In some implementations, vibration may introduce undesirable high-frequency motion disturbances at the print head 200. These vibrations may be detected and the amplitude of such vibrations measured by the IMU 210. The control circuitry 120 may combine the acceleration at least one signal provided by the IMU 210 with the estimated position of the actuator system 118 and the projected pattern 130 data obtained from the one or more image acquisition devices 116 to manage both low-frequency, long-term drift and high-frequency disturbances.

Figure 4:
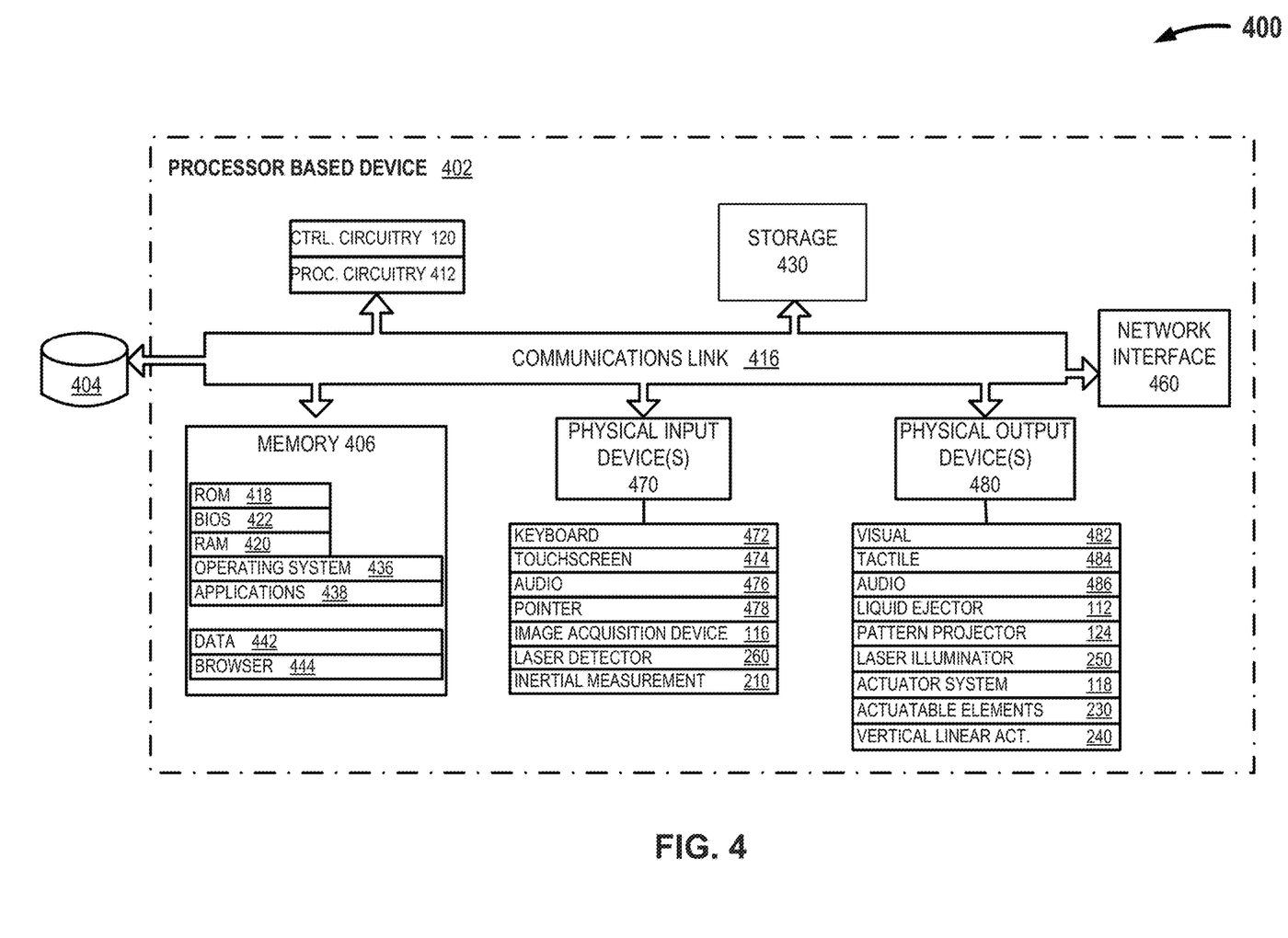
FIG. 4 provides a block diagram illustrating an example graphic output system that includes a processor based device that includes at least one print head and at least one pattern projector, in accordance with at least one embodiment of the present disclosure.

FIG. 4 is a block diagram illustrating an example system 400 that includes a processor based device 402 that includes at least one print head 110 and at least one pattern projector 124, in accordance with at least one embodiment of the present disclosure. The processor-based device 402 may, on occasion, include processor circuitry 412, at least a portion of which provides the control circuitry 120 that provides at least the functionality as described herein.

The processor circuitry 412 communicably couples to one or more storage devices 404. In embodiments, the one or more storage devices 404 may include, but are not limited to one or more hard disk drives, optical storage drives, solid state drives or similar non-transitory storage devices disposed in or proximate the processor-based device 402 and communicably coupled to the processor circuitry 412 via one or more communications links 416, for example one or more parallel cables, serial cables, or wireless channels capable of high speed communications, for instance via BLUETOOTH®, universal serial bus (USB), FIREWIRE®, or similar. In some embodiments, the one or more storage devices 404 may include, but are not limited to one or more servers, data stores, or similar non-transitory cloud or network-based storage devices disposed remote from the processor-based device 402 and communicably coupled to the processor circuitry 412 via one or more networks, such as a local area network (LAN), wireless local area network (WLAN), metropolitan area network (MAN), wide area network (WAN), worldwide network (WWAN or the "Internet") or one or more cellular networks.

The one or more processor-based devices 402 may be communicably coupled to one or more external devices, such as one or more print heads 200 and/or one or more actuator systems 118. In embodiments, the control circuitry 120 may be communicably coupled to the print head 200 and the one or more actuator systems 118 via one or more network interfaces 460. Example network interfaces 460 may include wireless network interfaces 460, such as: BLUETOOTH®, near field communications (NFC), ZigBee, IEEE 802.11 (Wi-Fi), 3G, 4G, LTE, CDMA, GSM, and similar. Example network interfaces 460 may include one or more wired network interfaces 460, such as: IEEE 802.3 (Ethernet), and similar. Unless described otherwise, the construction and operation of the various blocks shown in FIG. 4 are of conventional design. As a result, such blocks need not be described in further detail herein, as they will be understood by those skilled in the relevant art.

The system 400 may include one or more circuits capable of executing processor-readable instructions to provide at least, the control circuitry 120, a system memory 406 and a system bus 416 that bidirectionally communicably couples various system components including the system memory 406 to the portion of the processor circuitry 412 providing the control circuitry 120. The processor circuitry 412 may include, but are not limited to, any circuit capable of executing one or more machine-readable and/or processor-readable instruction sets, such as one or more single or multi-core central processing units (CPUs), digital signal processors (DSPs), application-specific integrated circuits (ASICs), field programmable gate arrays (FPGAs), systems on a chip (SOCs), etc.

The system bus 416 may employ any known bus structures or architectures, including a memory bus with memory controller, a peripheral bus, and/or a local bus. The system memory 406 includes read-only memory ("ROM") 418 and random access memory ("RAM") 420. A basic input/output system ("BIOS") 422 disposed in the ROM 418. The BIOS 422 contains basic instructions during that, during system start-up, cause the transfer information between elements within the processor-based device 402.

The processor-based device 402 may include one or more storage devices 430. The one or more storage devices 430 may include, but are not limited to, any current or future developed optical storage drives (e.g., compact disc (CD), digital versatile disk (DVD), and similar). The one or more storage devices 430 may include, but are not limited to, any type of current or future developed rotating or stationary device in which data is stored in a magnetic and/or electromagnetic format such as a solid-state drive (SSD) and various forms of removable storage media (e.g., secure digital (SD), secure digital high capacity (SD-HC), universal serial bus (USB) memory stick, and similar). The one or more storage devices 430 may include, but are not limited to, any current or future developed atomic spin, molecular storage devices. The one or more storage devices 430 may include integral or discrete interfaces or controllers (not shown in FIG. 4).

Machine-readable instruction sets may be stored or otherwise retained in whole or in part in the system memory 406. Such machine-readable instruction sets may include, but are not limited to an operating system 436, one or more applications 438, system, program, and/or application data 442, and one or more communications applications such as a Web browser 444. The one or more application instruction sets 438 may include instruction sets providing the functionality described herein.

For example, the one or more applications 438 may include one or more instruction sets that cause the control circuitry 120 to generate multiple structured light patterns 130 on the surface 102 prior to applying the first graphic output portion 140$_1$. Using the data collected from each of the multiple structured light patterns 130, the control circuitry 120 may generate a three-dimensional map of at least a portion of the surface 102.

In another example, the one or more applications 438 may include one or more instruction sets that, when executed, cause the control circuitry 120 to cause the pattern projector 124 to generate and output a pattern 130 on the surface 102. The pattern 130 may include a structured pattern, a random pattern, a pseudorandom pattern, or any other regular or irregular pattern providing the capability for the control circuitry 120 to position the print head 200 at a defined location above a surface 102.

In another example, the one or more applications 438 may include one or more instruction sets that, when executed, cause the control circuitry 120 to map a pattern projected on a surface 102 to a graphic output deposited on the surface 102. Such an application permits the precise positioning of the print head 200 at a defined location above the surface 102 preparatory to applying or otherwise depositing a graphic output portion 140 on the surface.

In another example, the one or more applications 438 may include one or more instruction sets that, when executed, cause the control circuitry 120 to cause the laser line projector 250 to generate a structured light pattern across at least a portion of the surface 102. The one or more applications 438 may further cause the control circuitry 120 to perform a structured light analysis to detect surface irregularities or surface features present in, on, or across the surface 102 using the laser pattern projected by the laser line projector 250.

In another example, the one or more applications 438 may include one or more instruction sets that, when executed, cause the control circuitry 120 to position the print head 200 at a defined location above the surface 102 using the actuator system 118. In at least some embodiments, such positioning may be accomplished by comparing the projected pattern 130 on the surface 102 with a graphic image mapped to the projected pattern 130. In some embodiments, the control circuitry 120 may generate a three-dimensional model of the surface 102 prior to generating a pattern 130 for projection on the surface 102. Such a system may advantageously permit projecting a pattern 130 having a greater resolution across highly complex portions of the surface 102.

In another example, the one or more applications 438 may include one or more instruction sets that, when executed, cause the control circuitry 120 to obtain position, velocity, and/or acceleration data from the inertial measurement unit 210 disposed in the print head 200. The control circuitry 120 may use information obtained from the IMU 210 to account for vibrations and similar oscillations in the print head 200 and/or the actuator system 118 to provide greater precision and accuracy when depositing the graphic output portion $140_n$ on the surface 102.

In another example, the one or more applications 438 may include one or more instruction sets that, when executed, cause the control circuitry 120 to obtain information from the standoff sensors 220 to maintain a constant distance or offset between the print head 200 and the surface 102. In some implementations, the one or more applications 438 may cause the control circuitry 120 to generate outputs communicated to the actuatable elements 230 and/or the vertical linear actuators 240 to maintain a constant distance and/or location of the print head 200 from the surface 102.

In another example, the one or more applications 438 may include one or more instruction sets that, when executed, cause the control circuitry 120 to generate one or more graphic pattern generation instruction sets. The one or more graphic pattern generation instruction sets may cause one or more liquid ejector 112 to deposit a graphic output 142 by depositing a plurality of graphic output portions 140 on the surface 102.

While shown in FIG. 4 as being stored in the system memory 406, the operating system 436, applications 438, application data 442, and/or browser 444 may, on occasion, be stored in whole or in part on one or more other storage devices such as the one or more storage devices 430.

The control circuitry 120 may receive input, information, and/or data from a plurality of physical input devices 470 communicably coupled to the processor-based device 402. System users may provide information and/or data to the processor-based device 402 using one or more keyboards 472, one or more touchscreen I/O devices 474, one or more audio input devices 476 (e.g., microphone) and/or one or more pointing devices 478. In addition, the control circuitry 120 may autonomously receive input information and/or data via one or more signals communicated by the one or more image acquisition devices 116, one or more laser detectors 250, and the one or more inertial measurement units 210. In embodiments, the signals received by the processor-based device 402 may be received via the network interface 460 (e.g., via IEEE 802.3 Ethernet, IEEE 802.11 Ethernet, BLUETOOTH®, Zigbee®, Near Field Communications or "NFC" or similar). In embodiments, the signals received by the processor-based device 402 may be received via one or more one or more wired interfaces (e.g., Universal Serial Bus or "USB").

The control circuitry 120 may produce output that is presented or communicated to a plurality of physical output devices 480 communicably coupled to the processor-based device 402. System users may receive output from the processor-based device 402 via one or more visual or video output devices 482, one or more tactile or haptic output devices 484, and/or one or more audio output devices 486.

In addition, the control circuitry 120 may autonomously generate one or more output signals communicated to the one or more liquid ejectors 116, the one or more pattern projectors 124, the one or more laser illuminators 250, the actuator system 118, the one or more actuatable elements 230, and/or the one or more vertical linear actuators 240. In embodiments, the signals communicated by the processor-based device 402 to peripheral devices may be transmitted via the network interface 460 (e.g., via IEEE 802.3 Ethernet, IEEE 802.11 Ethernet, BLUETOOTH®, Zigbee®, Near Field Communications or "NFC" or similar). In embodiments, the signals communicated by the processor-based device 402 to peripheral devices may be transmitted via one or more wired interfaces (e.g., Universal Serial Bus or "USB").

Figure 5:
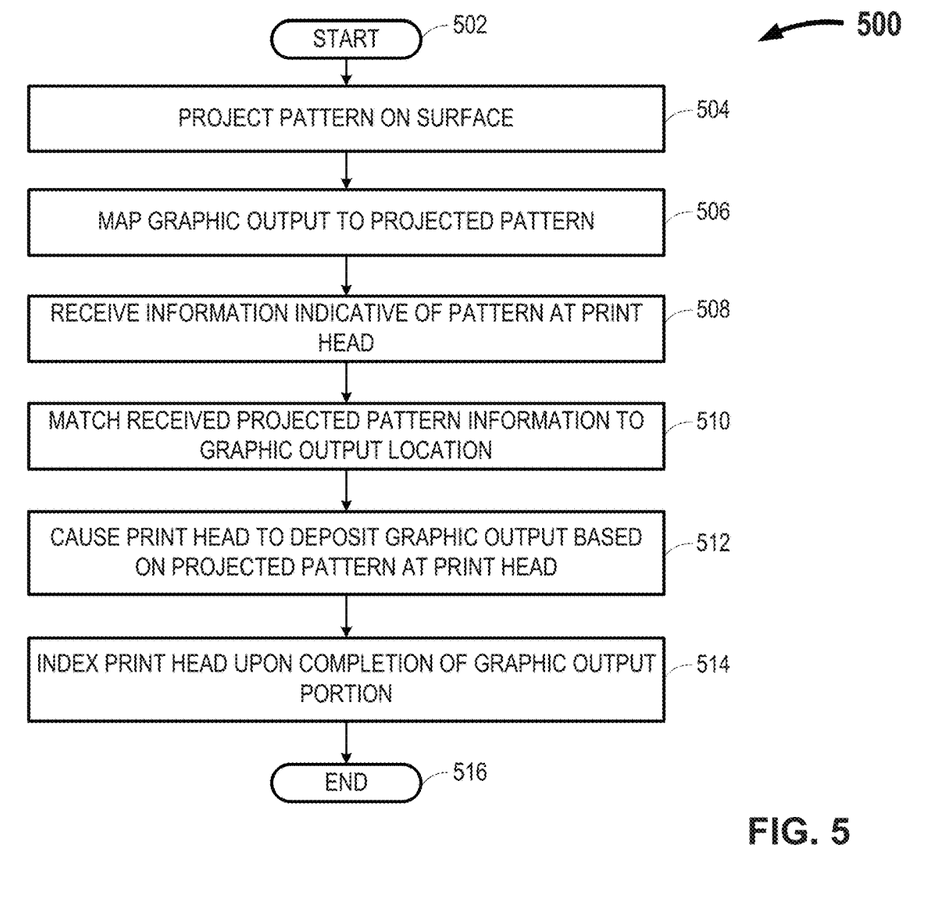
FIG. 5 provides a high-level flow diagram of an illustrative graphic output method for accurately depositing a graphic output on a large, irregular, and/or contoured surface, in accordance with at least one embodiment of the present disclosure.

FIG. 5 is a high-level flow diagram of an illustrative method 500 for accurately depositing a graphic output 142 on a large, irregular, and/or contoured surface 102, in accordance with at least one embodiment of the present disclosure. The method 500 commences at 502.

At 504, the control circuitry 120 causes the one or more pattern projectors 124 to project a pattern 130 on the surface 102. In embodiments, the control circuitry 120 may generate the pattern 130 or may select a pattern from a stored library of patterns 130. The pattern 130 may be projected in one or more visible wavelengths between 390 nanometers and 700 nanometers; in one or more infrared wavelengths above 700 nanometers; or in one or more ultraviolet wavelengths below 390 nanometers. The pattern 130 may include one or more structured patterns, one or more random patterns, or one or more pseudo-random patterns. The pattern 130 may completely cover the extent of the surface 102 or may only cover a portion of the surface 102 receiving the graphic output 142. In embodiments, the pattern 130 may be formed using only a single pattern projector 124. In other embodiments, the pattern 130 may be formed using a plurality of pattern projectors $124_1$-$124_n$.

At 506, the control circuitry 120 maps the graphic output 142 to the projected pattern 130. In embodiments, the system user may adjust one or more graphic output parameters (size, shape, orientation, etc.). The control circuitry 120 maps the projected pattern 130 to the graphic output 142. The control circuitry 120 uses the received image data representative of the projected pattern 130 to determine a location of the print head 200 with respect to the projected pattern 130 and with respect to the overall graphic output 142.

At 508, the control circuitry 120 receives at least one signal that includes information representative of the projected pattern 130 proximate the print head 200 from the one or more image acquisition devices 116. In embodiments, the one or more image acquisition devices 116 may obtain image data that includes information representative of the projected pattern adjacent to the print head 200. The at least one signal includes information or data representative of the projected pattern 130 that falls within the field of view of the one or more image acquisition devices 116.

At 510, the control circuitry 120 matches the projected pattern 130 proximate the print head 200 to a corresponding location in the graphic output 142.

At 512, the control circuitry 120 causes the liquid ejector 112 to deposit the graphic output portion $140_n$ on the surface based, at least in part, on the location of the print head 200 with respect to the projected pattern 130. In embodiments, as the graphic output portion $140_n$ is deposited on the surface 102, the control circuitry 120 periodically, intermittently, aperiodically, or continuously determines the location of the print head 200 using the projected pattern 130. Further, the use of the projected pattern 130 permits the control circuitry 120 to cause the liquid ejector 112 to align adjacent graphic output portions (e.g., $140_{n-1}/140_n/140_{n+1}$) to achieve a printing resolution of about 50 dots per inch (dpi); about 100 dpi; about 200 dpi; about 300 dpi; about 450 dpi; or about 600 dpi. Such location determination allows the printing system 100 to apply a large-scale graphic output 140 to the surface 102 using any number of graphic output portions $140_1$-$140_x$.

At 514, the control circuitry 120 causes the print head 200 to index after completing the graphic output portion $140_n$. In at least one embodiment, the control circuitry 120 indexes the print head 200 such that the liquid ejector 112 aligns with the projected pattern 130 and positions the liquid ejector 112 at a location proximate the most recently applied graphic output portion $140_n$. The method 500 concludes at 516.

Figure 6:
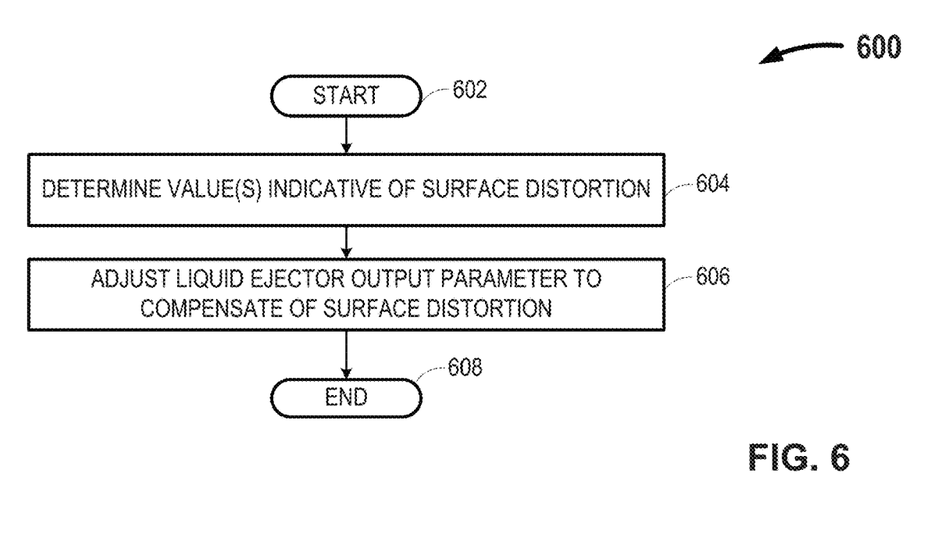
FIG. 6 provides a high-level flow diagram of an illustrative graphic output method of depositing graphic output on a large, irregular, and/or contoured surface that includes measuring a surface distortion and adjusting one or more parameters of the graphic swath to compensate for the measured surface distortion, in accordance with at least one embodiment of the present disclosure.

FIG. 6 is a high-level flow diagram of an illustrative method 600 of depositing graphic output 142 on a large, irregular, and/or contoured surface 102 that includes measuring a surface distortion and adjusting one or more parameters of the graphic swath to compensate for the measured surface distortion, in accordance with at least one embodiment of the present disclosure. The control circuitry 120 may implement the method 600 in conjunction with the graphic output method 500 described in detail above. In some implementations, the surface 102 may include various distortions, contours, and/or irregularities that would degrade the quality of or introduce distortion to the graphic output 142 deposited on the surface 102. In such instances, the control circuitry 120 may detect such distortions, contours, and irregularities in the surface 102 and may alter or adjust one or more parameters in one or more graphic output portions 140 to minimize or even eliminate the degradation in quality or distortion introduced by a particular distortion, contour, or irregularity. The method 600 commences at 602.

At 604, the control circuitry 120 receives one or more signals that include information or data representative of a distortion, contour, or irregularity in the surface 102. In at least some implementations, the print head 200 may include a laser emitter 250 that projects onto the surface 102 and a laser image acquisition device 260. The signal generated by the laser image acquisition device 260 may include information or data indicative of distortions, contours, and/or irregularities in the surface 102. The control circuitry 120 may determine one or more parameters associated with the distortion, contour, and/or irregularity in the surface 102 based at least in part on the laser information or data included in the signal received from the laser image acquisition device 260.

In some implementations, the print head 200 may include one or more structured light sources that project onto the surface 102. In such an implementation, the one or more image acquisition devices 116 may provide one or more signals that include information or data representative of the structured light pattern on the surface 102. The control circuitry 120 may determine one or more parameters associated with the distortion, contour, and/or irregularity in the surface 102 based at least in part on the structured light information or data included in the signal received from the image acquisition device 116.

In some implementations, the control circuitry 120 may detect distortions, contours, and/or irregularities in the surface 102 prior to commencing deposition of the graphic output portion $140_n$. In some implementations, the control circuitry 120 may detect distortions, contours, and/or irregularities in the surface 102 "on the fly" or contemporaneous with the deposition of the graphic output portion $140_n$.

At 606, the control circuitry 120 may alter or adjust one or more parameters of the graphic output portion $140_n$ in response to detecting a distortion, contour, or irregularity in the surface 102. The one or more parameters may include, but are not limited to, a color, a hue, a brightness, a color density, or combinations thereof. The method 600 concludes at 608.

Figure 7:
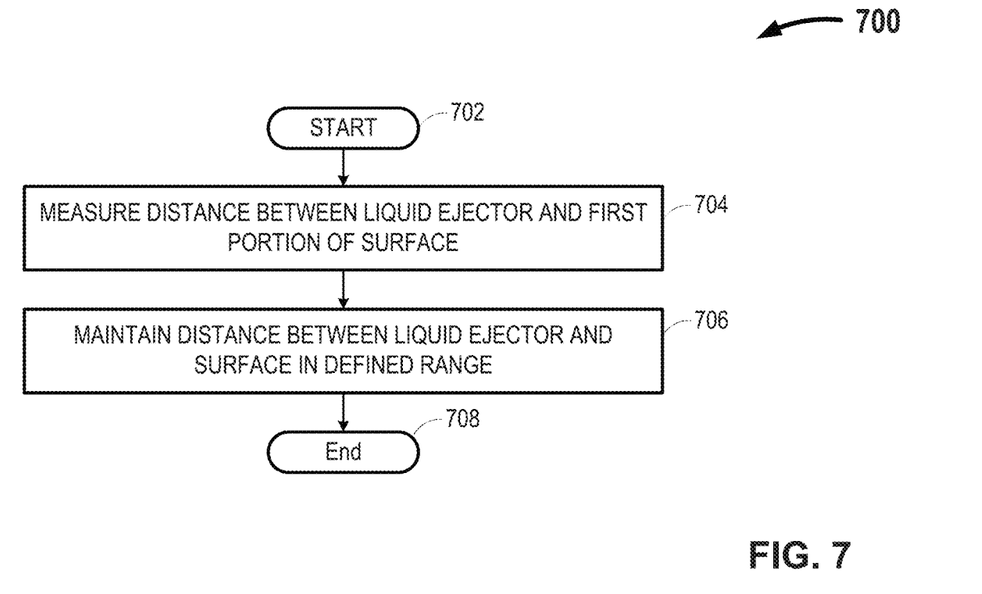
FIG. 7 provides a high-level flow diagram of an illustrative method of depositing graphic output on a large, irregular, and/or contoured surface that includes measuring a distance between a liquid ejector and a surface and maintaining the measured distance within a defined range, in accordance with at least one embodiment of the present disclosure.

FIG. 7 is a high-level flow diagram of an illustrative method 700 of depositing graphic output 142 on a large, irregular, and/or contoured surface 102 that includes measuring a distance between a liquid ejector 112 and a surface 102 and maintaining the measured distance within a defined range, in accordance with at least one embodiment of the present disclosure. In embodiments, inkjet printing deposits a liquid on the surface in a precise dot pattern to form a graphic output 142. Maintaining a consistent distance between the print head 200 and the surface 102 may improve the quality of the resultant graphic output 142. The method 700 commences at 702.

At 704, the control circuitry 120 receives one or more signals from the standoff sensors 204. The one or more signals provided by the standoff sensors 204 may include information or data representative of a measured distance between the print head 200 and the surface 102.

At 706, the control circuitry 120 generates one or more output signals that are communicated to the vertical linear actuators 240 operably coupled to the liquid ejector 112. The control circuitry 120 may cause the vertical linear actuators 240 to adjust the position of the liquid ejector 112 such that the distance between the liquid ejector 112 and the surface 102 is maintained within a defined range. The method 700 concludes at 708.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An application system comprising:
at least one projector to project across a surface a pattern that includes a plurality of elements, the at least one projector including one or more actuated monochromatic lasers that sweep across at least a portion of the surface, the one or more monochromatic lasers generating an electromagnetic output having a wavelength in a first spectral band;
a print head having a defined positional uncertainty that includes:
at least one image acquisition device, the at least one image acquisition device responsive to incident electromagnetic energy in at least the first spectral band;
a liquid ejector to deposit a pigmented liquid on a surface;
a plurality of actuatable elements operably coupled to the print head; and
control circuitry communicably coupled to the at least one projector, the at least one image acquisition device and the print head, the control circuitry to:
cause the at least one projector to project the plurality of elements that form the projected pattern on the surface, each of the plurality of elements having at least one dimension equal to or greater than the defined positional uncertainty of the print head;
map the projected pattern to a graphic output;

position the liquid ejector with respect to the projected pattern on a first portion of the surface, the position based at least in part on data received from the at least one image acquisition device;

cause the liquid ejector to selectively deposit the pigmented liquid to form at least a portion of the graphic output on the first portion of the surface.

2. The application system of claim 1, further comprising: a platform stationary with respect to the surface, the platform to support the at least one projector.

3. The application system of claim 1 wherein the at least one image acquisition device comprises at least one image acquisition device disposed at least partially in the print head.

4. The application system of claim 1, the control circuitry to further:

index the print head based on the projected pattern at the completion of each portion of the graphic output such that the liquid ejector deposits each subsequent portion of the graphic output at a location on the surface that is adjacent to the first portion of the surface.

5. The application system of claim 1 wherein the one or more actuated monochromatic lasers generate an electromagnetic output at a wavelength in a visible portion of the electromagnetic spectrum having wavelengths extending from 390 nanometers to 700 nanometers; and wherein the at least one image acquisition device includes one or more image sensors sensitive to electromagnetic energy in the visible portion of the electromagnetic spectrum.

6. The application system of claim 1 wherein the one or more actuated monochromatic lasers generate an electromagnetic output at a wavelength in an ultraviolet portion of the electromagnetic spectrum having wavelengths of less than 390 nanometers; and wherein the at least one image acquisition device includes one or more image sensors sensitive to electromagnetic energy in the ultraviolet portion of the electromagnetic spectrum.

7. The application system of claim 1 wherein the one or more actuated monochromatic lasers generate an electromagnetic output at a wavelength in an infrared portion of the electromagnetic spectrum having wavelengths of greater than 700 nanometers; and wherein the at least one image acquisition device includes one or more image sensors sensitive to electromagnetic energy in the infrared portion of the electromagnetic spectrum.

8. The application system of claim 1, further comprising: a plurality of distance measurement devices to measure a distance between at least the liquid ejector and the first portion of the surface.

9. The application system of claim 8 wherein at least a portion of the plurality of distance measurement devices comprise a plurality of distance measurement devices disposed in the print head.

10. The application system of claim 9, the control circuitry to further:

receive information that includes data indicative of the measured distance between the liquid ejector and the surface; and maintain the liquid ejector within a defined distance range from the first portion of the surface.

11. The application system of claim 1 wherein one or more liquid ejector comprises a multi-color inkjet print head.

12. The application system of claim 11, further comprising a plurality of fluid reservoirs, each of the plurality of fluid reservoirs fluidly coupled to the one or more liquid ejector, each of the reservoirs to receive at least one pigmented fluid.

13. The application system of claim 1, the print head controller to further:

selectively adjust the application of the portion of the graphic output to the first portion of the surface based at least in part on data representative of a three-dimensional contour map of the surface, the three dimensional contour map may be generated using the pattern projected on the surface.

14. The application system of claim 1, further comprising a housing disposed at least partially about at least one or more liquid ejectors;

wherein the at least one image acquisition device is disposed at a defined location in the print head with respect to the one or more liquid ejectors.

15. The application system of claim 14, wherein at least a portion of the plurality of actuatable elements include at least one actuatable element operably coupled to the liquid ejector, the at least one actuateable element to adjust at least one of: a roll, a pitch, or a yaw of the one or more liquid ejectors with respect to the surface.

16. The application system of claim 14, further comprising:

a first high-bandwidth linear actuator operably coupled to the control circuitry to cause the one or more liquid ejectors to track the projected pattern along a first axis.

17. The application system of claim 16 wherein the high-bandwidth linear actuator further comprises:

a second high-bandwidth linear actuator operably coupled to the control circuitry to cause the one or more liquid ejectors to track the projected pattern along a second axis, the second axis orthogonal to the first axis and orthogonal to a direction of travel of the one or more liquid ejectors.

18. The application system of claim 1:

wherein the plurality of elements forming the projected pattern includes a structured light pattern.

19. The application system of claim 1:

wherein the plurality of elements forming the projected pattern includes at least one of a random pattern of elements or a pseudo-random pattern of elements.

* * * * *